(12) United States Patent
Lai

(10) Patent No.: US 8,427,585 B2
(45) Date of Patent: Apr. 23, 2013

(54) RECEIVING APPARATUS AND RECEIVING METHOD THEREOF

(75) Inventor: Chao-Min Lai, Tao Yuan County (TW)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

(21) Appl. No.: 13/310,152

(22) Filed: Dec. 2, 2011

(65) Prior Publication Data

US 2012/0140122 A1    Jun. 7, 2012

(30) Foreign Application Priority Data

Dec. 3, 2010    (TW) .............................. 99142115 A

(51) Int. Cl.
*H04N 5/14*    (2006.01)
*H04N 5/268*    (2006.01)

(52) U.S. Cl.
USPC .......................................... 348/707; 348/706

(58) Field of Classification Search .......... 348/705–708, 348/725, 731; 725/85, 38, 100, 131, 139, 725/151; *H04N 5/268, 5/14, 9/64, 5/44, H04N 5/50*

See application file for complete search history.

(56) References Cited

U.S. PATENT DOCUMENTS

| | | | |
|---|---|---|---|
| 2003/0035070 A1* | 2/2003 | Fanous et al. | ................. 348/707 |
| 2009/0025043 A1* | 1/2009 | Song et al. | ........................ 725/85 |
| 2011/0105053 A1* | 5/2011 | Nakamura et al. | .............. 455/83 |

* cited by examiner

*Primary Examiner* — Sherrie Hsia
(74) *Attorney, Agent, or Firm* — Muncy, Geissler, Olds & Lowe, PLLC

(57) ABSTRACT

The present invention discloses a signal receiver and a method thereof. The signal receiver utilizes a switch unit to regulate a loop-through, where the complete function of the loop-through is accomplished even during a sleep mode, which reduces power consumption of the signal receiver.

10 Claims, 3 Drawing Sheets

RECEIVING APPARATUS AND RECEIVING METHOD THEREOF

BACKGROUND OF THE INVENTION

1. Field of the Invention

The present invention relates to a signal receiver, more particularly, to a receiver and a method thereof for receiving radio frequency (RF) signals.

2. Description of the Related Art

Multimedia applications, which include the set-top box (STB), television (TV), home media player, and media center are commonly incorporated with a loop-through (i.e., RF-in to RF-out) that enables the sharing of RF signals when multimedia devices are serially coupled without an additional divider.

The loop-through in devices for multimedia applications generally include additional electronic components, e.g., a low noise amplifier (LNA) or an attenuator. These additional electronic components consume power when devices are working in sleep mode, which is a great problem in the compliance with power consumption regulations, i.e., during sleep mode.

Accordingly, a signal receiver and method thereof are developed with an innovative RF loop-through to reduce power consumption during sleep mode.

SUMMARY OF THE INVENTION

The object of the present invention is to provide a signal receiver that can effectively reduce power consumption while a complete loop-through function is still capable during sleep mode.

An embodiment of the present invention is a signal receiver. The signal receiver comprises a switch unit, a low noise amplifier, a power divider, and an attenuator. The switch unit receives an input signal and regulates a loop-through of the signal receiver. The low noise amplifier is coupled to the switch unit and amplifies the input signal to generate an amplified signal during a first mode. The power divider is coupled to the low noise amplifier and divides the amplified signal into at least two divided signals. The attenuator is coupled to the power divider and attenuates one of the divided signals to generate an attenuated signal during the first mode. The switch unit regulates the input signal to perform the loop-through without passing through the low noise amplifier during a second mode, where the first and second modes are substantially different modes of the signal receiver.

Another embodiment of this present invention is a signal-receiving method for a signal receiver. The method comprises the steps of receiving an input signal and regulating a loop-through of the signal receiver, amplifying the input signal and generating an amplified signal during a first mode, dividing the amplified signal into at least two divided signals, attenuating one of the divided signals and generating an attenuated signal during the first mode, wherein the loop-through is performed without passing through the low noise amplifier during a second mode, where the first and second modes are substantially different modes of the signal receiver.

DETAILED DESCRIPTION OF THE INVENTION

Figure 1:
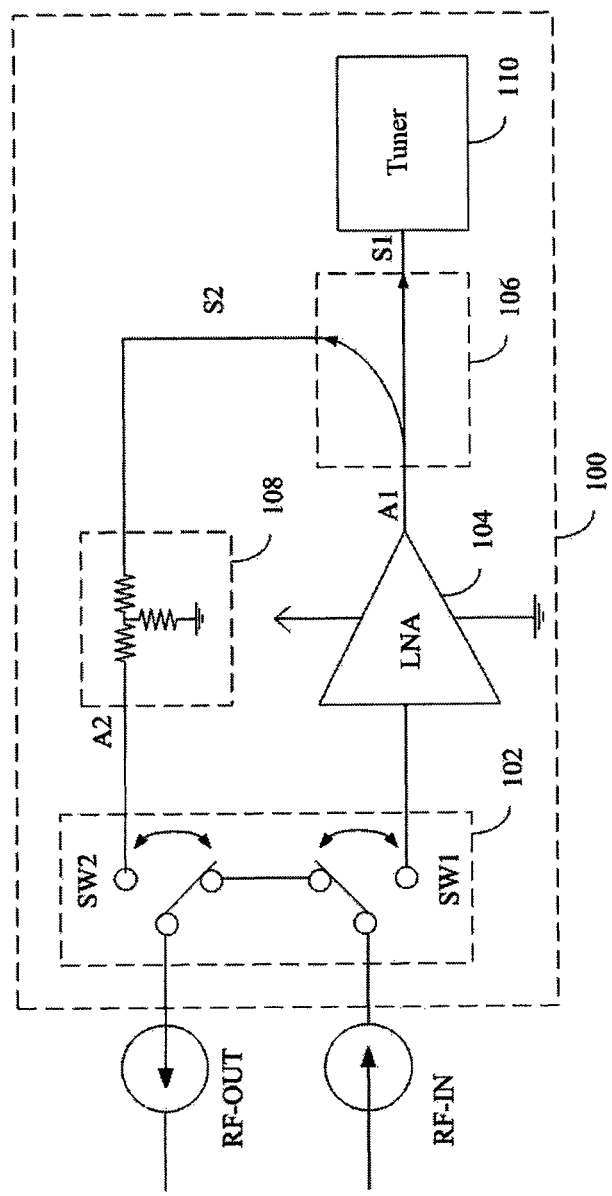
FIG. 1 is a schematic circuit block diagram showing a first preferred embodiment of the present invention.

Referring to FIG. 1, the first preferred embodiment of a signal receiver 100 in the present invention includes a switch unit 102, an amplifier LNA 104, a power divider 106, an attenuator 108, and a tuner 110. The signal receiver 100 in this embodiment operates in at least two modes, including a normal mode and a sleep mode.

During operations of the signal receiver 100 in normal mode, switch SW1 and switch SW2 in the switch unit 102 are respectively switched to the amplifier LNA 104 and the attenuator 108 to receive an input signal RE-IN. The input signal RE-IN passes through switch SW1 and enters the amplifier LNA 104 to generate an amplified signal A1. The power divider 106 divides the amplified signal A1 into signals S1 and S2, where signal S1 is transmitted to the tuner 110 and signal S2 is transmitted to the attenuator 108. The attenuator 108 attenuates signal S2 to generate an attenuated signal A2 that passes through switch SW2 to generate an output signal RF-OUT. By generating the output signal RF-OUT, the loop-through is complete. The output signal RF-OUT is therefore ready for transmission to another image-processing device, e.g. TV, Set Top Box (STB) or Person Video Recorder (PVR).

When the signal receiver 100 operates in sleep mode, switches SW1 and SW2 are coupled in the switch unit 102 to transmit the input signal RE-IN directly through switches SW1 and SW2, promptly generating the output signal RF-OUT, which is transmitted to another image-processing device. The signal receiver 100 can transmit signals via a direct route that bypasses the amplifier LNA 104 during sleep mode. The amplifier LNA 104 can then operate in a power saving mode by shutting down or by hibernating. Hence, the signal receiver 100 reduces its power consumption. According to an embodiment of the present invention, the power attenuation induced by either switch SW1 or SW2 is set to be less than 0.5 dB. The total power attenuation of switches SW1 and SW2 is therefore less than 1 dB, which is compliant with standard regulations for sleep mode.

Figure 2:
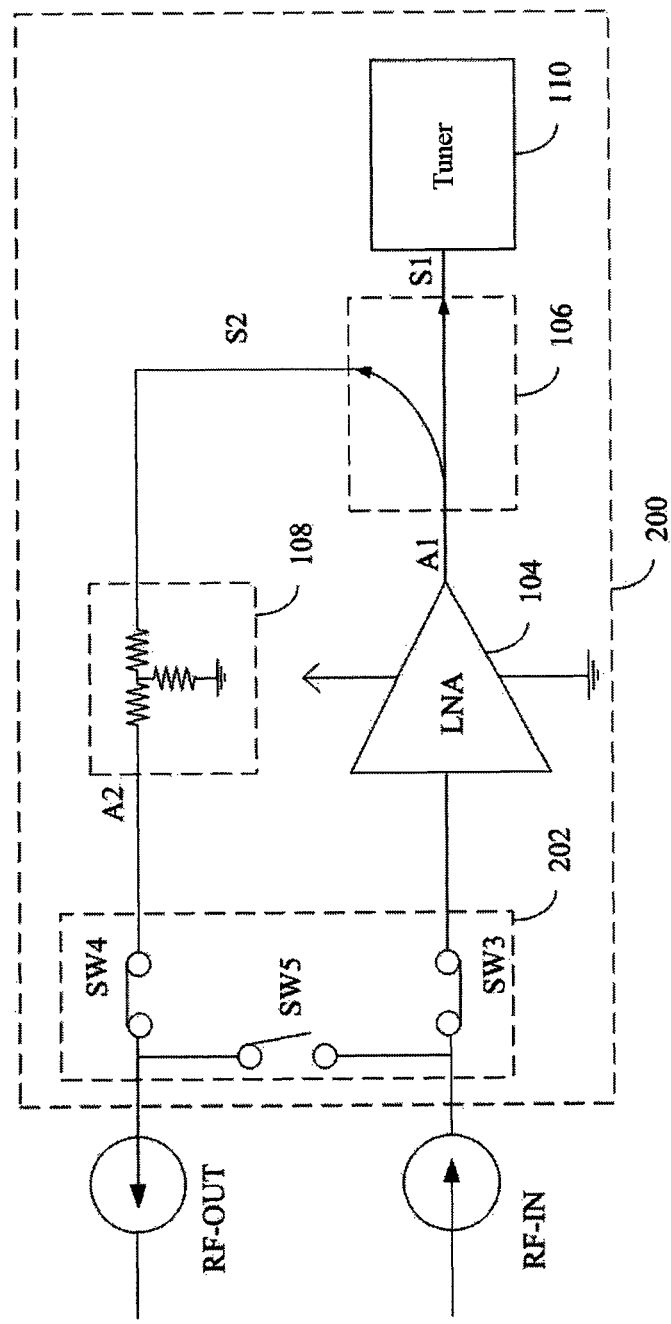
FIG. 2 is a schematic circuit block diagram showing a second preferred embodiment of the present invention.

Referring to FIG. 2, the second preferred embodiment of a signal receiver 200 in the present invention includes a switch unit 202 with three single-pole-single-throw (SPST) switches.

As compared to the first preferred embodiment, the second preferred embodiment operates in a similar manner. When the signal receiver 200 operates in normal mode, switches SW3 and SW4 turn "ON" while switch SW5 turns "OFF". The input signal RF-IN passes through switch SW3 and enters the amplifier LNA 104 that amplifies the input signal RF-IN to generate an amplified signal A1. The power divider 106 then divides the amplified signal A1 into divided signals S1 and S2, where signal S1 enters the tuner 110 while signal S2 passes through the attenuator 108 to generate an attenuated signal A2. The attenuated signal A2 then passes through switch SW4, which outputs the output signal RF-OUT to complete the loop through function.

During operations of the signal receiver 200 in sleep mode, switch SW3 and switch SW4 in the switch unit 202 are turned "OFF" while switch SW5 in the switch unit 202 is turned "ON". The input signal RF-IN received by the signal receiver 200 passes through switch SW5, generating an output signal RF-OUT that is transmitted to another image-processing device directly. The input signal RF-IN does not pass through the amplifier LNA 104 in sleep mode, instead, the input signal RF-IN passes through the SW5 and completes the loop-through by outputting the output signal RF-OUT. Hence, the amplifier LNA 104 can operate in a power-saving mode and reduce power consumption by shutting down the amplifier LNA 104 or by keeping the amplifier LNA 104 in a certain power-saving mode.

Figure 3:
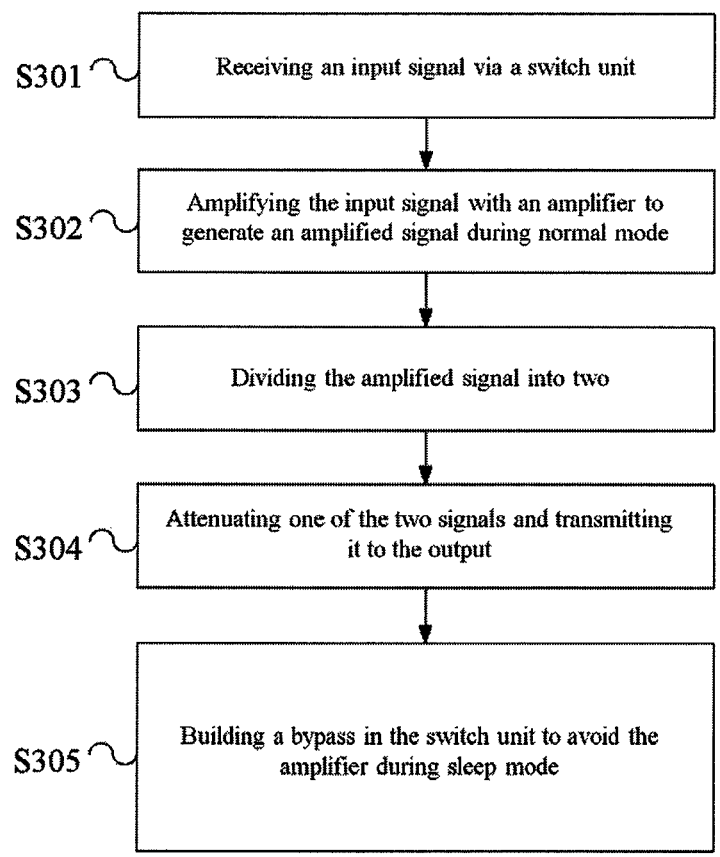
FIG. 3 is a flowchart showing a preferred embodiment of the signal receiving method of the present invention.

FIG. 3 illustrates an embodiment of the method for signal receiving. This preferred embodiment includes the following steps:

S301: Receiving an input signal via a switch unit;
S302: Amplifying the input signal with an amplifier to generate an amplified signal during normal mode;
S303: Dividing the amplified signal into two;
S304: Attenuating one of the two signals and transmitting it to the output;
S305: Building a bypass in the switch unit to avoid the amplifier during sleep mode According to the aforementioned descriptions, embodiments in the present invention, demonstrating the signal receiver and the method thereof, can be implemented by incorporating a switch unit in the front end of a signal receiver to regulate transmission paths of input signals to complete the loop-through function during different operating modes. Even though some electronic components in the signal receiver shut down during the sleep mode to save power, the loop-through is still functioning.

The present invention is not limited within the embodiments as illustrated in the aforementioned descriptions. The modification in the range of the same concept of the present invention is included as a same or an equivalent invention thereto.

What is claimed is:

1. A signal receiver, comprising:
a switch unit for receiving an input signal and regulating a loop-through of the signal receiver;
a low noise amplifier, coupled to the switch unit, for amplifying the input signal and generating an amplified signal during a first mode;
a power divider, coupled to the low noise amplifier, for dividing the amplified signal into a plurality of at least two divided signals; and
an attenuator, coupled to the power divider, for attenuating one of the divided signals and generating an attenuated signal during the first mode,
wherein the switch unit regulates the input signal to perform the loop-through without passing through the low noise amplifier during a second mode, where the first and second modes are substantially different modes of the signal receiver.

2. The signal receiver as set forth in claim 1, wherein said switch unit comprises:

a first switch, coupled to the low noise amplifier during the first mode and decoupled from the low noise amplifier during the second mode; and
a second switch, coupled to the attenuator during the first mode and coupled to the first switch during the second mode,
wherein during the first mode, the input signal passes through the low noise amplifier and the attenuated signal transmits to an image-processing device via the second switch, whereas during the second mode, the input signal passes through the first and second switches and transmits directly to the image-processing device without passing through the low noise amplifier.

3. The signal receiver as set forth in claim 2, wherein the image-processing device is a TV, STB or PVR.

4. The signal receiver as set forth in claim 1, wherein another one of the divided signals is transmitted to a tuner.

5. The signal receiver as set forth in claim 1, wherein the first mode is normal mode and the second mode is sleep mode.

6. The signal receiver as set forth in claim 1, wherein the low noise amplifier operates in a power saving mode when the signal receiver operates in the second mode.

7. A signal-receiving method for a signal receiver, comprising:
receiving an input signal and regulating a loop-through of the signal receiver;
amplifying the input signal and generating an amplified signal during a first mode by a low noise amplifier;
dividing the amplified signal into a plurality of at least two divided signals; and
attenuating one of the divided signals and generating an attenuated signal during the first mode,
wherein the loop-through is performed without passing through the low noise amplifier during a second mode, where the first and second modes are substantially different modes of the signal receiver.

8. The method as set forth in claim 7, wherein the first mode is normal mode and the second mode is sleep mode.

9. The method as set forth in claim 7, wherein the low noise amplifier implements the step of amplifying the input signal.

10. The method as set forth in claim 9, wherein the low noise amplifier operates in a power saving mode when the signal receiver operates in the second mode.

* * * * *